United States Patent
Commons

[15] 3,695,374
[45] Oct. 3, 1972

[54] DIRIGIBLE WHEEL VEHICLE

[72] Inventor: Ward T. Commons, Route 1, Box 111, Scio, Oreg. 97374

[22] Filed: Aug. 7, 1970

[21] Appl. No.: 61,909

[52] U.S. Cl. ..................................180/27, 280/92
[51] Int. Cl. ..........................................B62d 61/08
[58] Field of Search.............180/27, 26, 25, 20, 89; 280/92, 87, 87.04

[56] References Cited

UNITED STATES PATENTS

| | | | |
|---|---|---|---|
| 3,519,097 | 7/1970 | Commons | 180/26 |
| 1,672,375 | 6/1928 | Cook et al. | 180/20 |
| 2,659,445 | 11/1953 | Church | 180/27 X |
| 3,033,301 | 5/1962 | Blue et al. | 180/26 |
| 3,156,313 | 11/1964 | Peterson | 180/27 X |
| 3,212,596 | 10/1965 | Johnson | 180/26 |
| 3,438,454 | 4/1969 | Rickel et al. | 180/54 |

*Primary Examiner*—Kenneth H. Betts
*Attorney*—Kolisch & Hartwell

[57] ABSTRACT

A vehicle with a vehicle frame including a pair of substantially horizontal rear members extending longitudinally of the vehicle at its rear. The forward part of the vehicle frame is made up of a pair of elongated forward members joined to said rear members and projecting forwardly and inclining upwardly therefrom. The forward members have front portions which converge on each other progressing forwardly and upwardly in the vehicle thus to form a tongue. Rear wheels support the rear members of the frame, and a single dirigible wheel disposed under such tongue supports the forward part of the frame. The engine for powering the vehicle is mounted on said frame with such lodged between the forward members adjacent where they join with the rear members, and located rearwardly of the tongue. Journaling the dirigible wheel on the tongue, is an upright spindle fixed to the tongue and with the upper and lower ends projecting above and below the tongue. Stabilizing collars snugly embrace the upper and lower ends of the spindle and are also joined to the tongue, these being left unjoined to the spindle. Above and below these stabilizing collars are upper and lower bearings which are mounted on a wheel mounting bracket which supports the dirigible wheel.

6 Claims, 4 Drawing Figures

PATENTED OCT 3 1972  3,695,374

Ward T. Commons
INVENTOR
BY Kolisch & Hartwell
Attys.

DIRIGIBLE WHEEL VEHICLE

This invention relates to a vehicle, and more particularly to a vehicle which is supported for movement by three wheels and includes a single dirigible wheel at one end for steering the vehicle.

A three-wheeled vehicle of the type contemplated has distinct advantages in operations requiring movement over rough terrain. By incorporating a tricycle arrangement for the wheels, all the wheels are assured of ground contact at all times. With pneumatic tires of substantial size included at the various wheels, a substantial flotation characteristic is attained, enabling the vehicle to operate in soft and muddy ground where ordinary vehicles become mired.

This invention generally contemplates improvements in vehicles of a three-wheeled class which result in a more rugged framework in the vehicle, and a more rugged mounting for the front dirigible wheel, whereby the vehicle is better enabled to withstand the shocks and stresses to which it is subjected during normal use.

One object of the invention is to provide a vehicle of the type described, featuring a frame comprising substantially horizontal rear members supported above the ground by a pair of rear wheels, and having forward members connected to the forward end of the rear members and extending forwardly and inclining upwardly therefrom. The front portions of the forward members converge to form a tongue at the front end of the vehicle having an elevated extremity disposed at substantially the midline of the vehicle. This elevated extremity is utilized in mounting a dirigible wheel at the front of the vehicle. The remaining portions of the forward members are utilized to mount the motor and cab for the vehicle and the rear members are utilized in supporting a load in relatively close proximity to the ground. The inclined forward expanse of the frame provides suitable clearance for the dirigible wheel which swivels under it, and is simply and economically constructed.

A further object is to provide such a vehicle wherein the motor for the vehicle is lodged between the forward members and the vehicle cab is supported thereover. Such mounting for the motor enhances the lowered center of gravity for the vehicle and thus improves its stability. Further, easy access to the motor for maintenance and repair is provided.

In a vehicle having a single dirigible wheel supporting one end, substantial stressing of the frame and mounting for the wheel results on movement of the vehicle over the ground. A problem, therefore, is presented in suitably mounting the dirigible wheel whereby it may swivel about an upright axis, without the mounting being so massive as to unduly weight the vehicle or obscure vision. A particular feature and object of the invention is to provide a novel connecting means which is employed to mount the dirigible wheel on the forward expanse of the vehicle frame, which braces the parts while permitting proper swivel movement of the wheel.

These and other objects and advantages will become more fully apparent as the invention is described in conjunction with the accompanying drawings, wherein.

Figure 2:
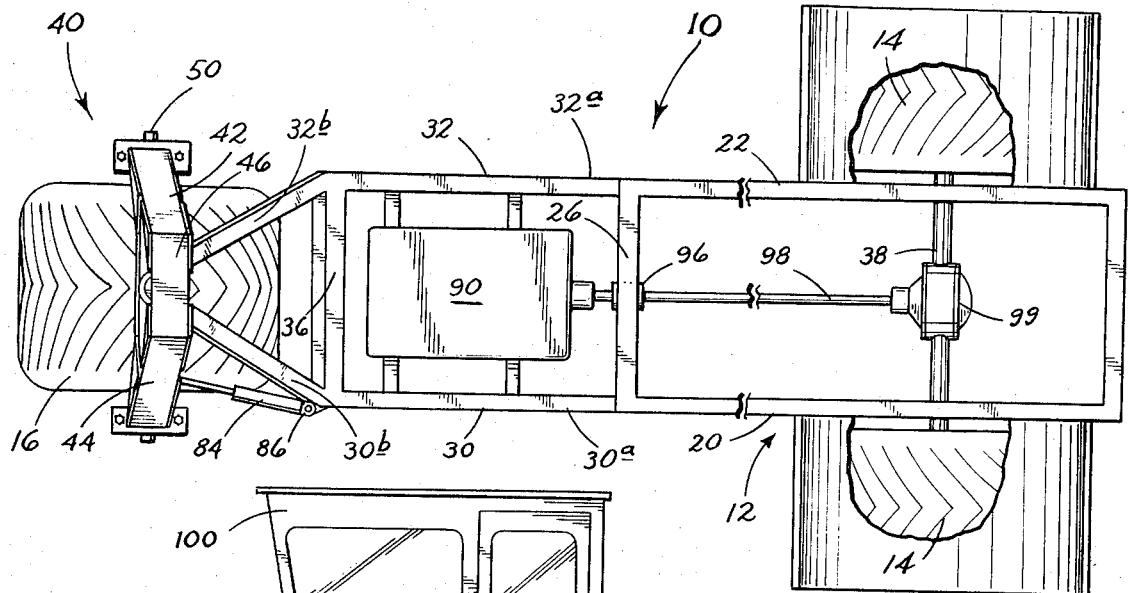
FIG. 2 is a view along the line 2—2 in FIG. 1.
Figure 1:
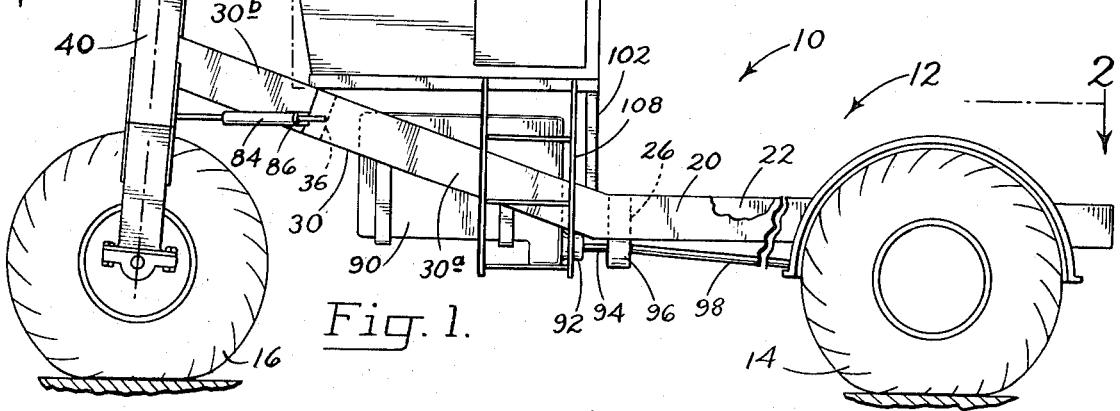
FIG. 1 is a side elevation of a vehicle according to an embodiment of the invention, including at the forward end thereof a single dirigible wheel employed in steering the vehicle.

Referring now to the drawings, and first more particularly to FIG. 1, at 10 is indicated generally a vehicle according to the invention. The vehicle, as is seen in FIGS. 1 and 2, includes a frame 12 which is supported at its rear end by opposed, laterally spaced rear wheels 14, and at its forward end by a single dirigible wheel, indicated at 16.

Frame 12 includes two substantially horizontal elongated rear frame members, indicated at 20, 22 suitably interbraced as by cross members, such as the cross member 26 shown. Progressing from the rear end of the vehicle (the right end in FIGS. 1 and 2) forwardly toward the location of cross member 26, the rear frame members are substantially parallel and laterally spaced from each other, with one forming one side and the other forming the opposite side of an elongated, substantially horizontal deck, or rear expanse.

The frame further includes a pair of laterally spaced forward frame members 30, 32 which form opposite sides of an elongated, inclined forward frame expanse. The forward frame members are connected at their rear set of ends to the forward set of ends of rear frame members 20, 22. This connection is in a region midway between the front and rear ends of the vehicle. The forward frame members extend forwardly in the vehicle from the rear frame members and are inclined upwardly therefrom. The forward frame members include portions 30a, 32a, which extend parallel to the center line of the vehicle, and front portions 30b, 32b, adjacent the forward end of the vehicle which converge on progressing forwardly and upwardly, in the vehicle to join adjacent the forward end of the vehicle. Converging front portions 30b, 32b form what is referred to herein as a tongue which is elevated with respect to the rear of the frame and is located at substantially the midline of the vehicle. A cross member 36 extends between and is secured at its opposite ends to frame members 30, 32, respectively, to brace the forward frame expanse.

To permit the vehicle to travel over soft ground, the vehicle's wheels are provided with wide tread pneumatic tires, as shown, giving a high degree of flotation to the wheels. Rear wheels 14 are disposed laterally outwardly to opposite sides of rear frame members 20, 22 and are mounted on suitable axle structure 38 carried on the rear expanse. The front dirigible wheel is located under the tongue and substantially at the midline of the vehicle. With such positioning of the wheels, the front and rear wheels do not track.

Figure 3:
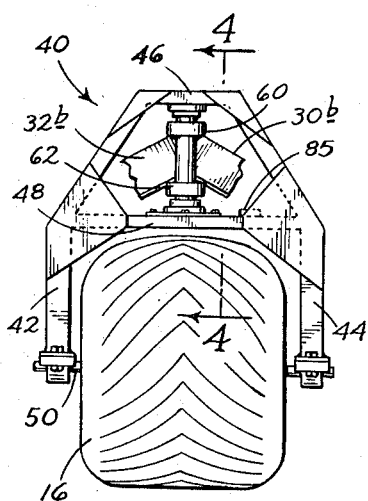
FIG. 3 is a front elevation of the dirigible wheel and its mounting shown in FIGS. 1 and 2.

Considering the mounting of the dirigible wheel, shown at 40 is a wheel mounting bracket. The wheel mounting bracket, as seen in FIG. 3, is substantially A-shaped, having a pair of upright legs 42, 44 which straddle wheel 16 and converge on progressing upwardly. An upper cross member 46 interconnects the upper ends of legs 40, 42 and a lower cross member 48 extends between and interconnects legs 40, 42 intermediate their ends. The lower ends of legs 42, 44 are journaled on opposite ends of an axle 50 on which wheel 16 is rotatably supported.

The wheel mounting bracket is journaled for pivotal movement about an upright axis which is inclined slightly from a true vertical to promote ease of steering. The pivot axis for the mounting bracket is indicated in FIG. 1 generally by the dot-dashed line 54.

Figure 4:
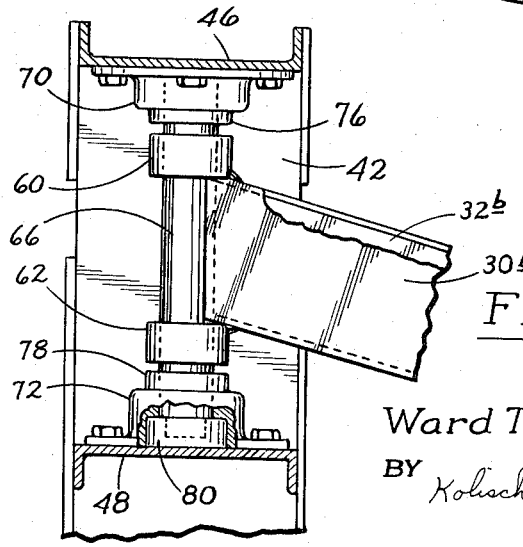
FIG. 4 is a view, somewhat enlarged, taken generally along the line 4—4 in FIG. 3.

Considering in detail the journal mounting for the mounting bracket, and referring specifically to FIG. 4, a pair of vertically spaced, rigid stabilizing collars 60, 62 are rigidly secured, as by welding, to the forwardmost ends of front portions 30b, 32b of the forward frame members and project forwardly therefrom. Each collar has a hole extending therethrough, and the collars are concentric.

An elongated upright spindle 66 extends through the holes in collars 60, 62 and is press fit therein, whereby the collars snugly embrace the spindle. The spindle is welded to the forwardmost ends of converging portions 30b, 32b, in the region between the collars. The spindle has an upper portion which extends above collar 60 and the upper margin of the tongue and a lower portion which extends below collar 62 and the lower margin of the tongue. Due to the spindle being press fit in the collars there is less stress concentration in the spindle in operation than would occur if the spindle were rigidly secured, as by welding, to the collars.

Securing plates 70, 72, having spindle-receiving bores therein, are fastened to cross members 46, 48, respectively, and receive opposite ends of spindle 66. An upper bearing assembly 76 journals the upper end of the spindle in plate 70. A lower bearing assembly 78 and a thrust bearing 80 journal and support the lower end of the spindle in plate 72. The mounting bracket thus is journaled on the spindle for pivoting about axis 54.

The dirigible wheel is steered under power by means of a fluid-operated ram shown at 84 in FIGS. 1 and 2. The forward end of the ram is pivotally connected to the mounting bracket, at 85 adjacent one end of cross member 48 (see FIG. 3). Progressing from this connection with the mounting bracket, the ram extends rearwardly adjacent the tongue to a pivot connection 86 with the vehicle frame (see FIGS. 1 and 2).

An engine, or motor, used in propelling the vehicle over the ground is shown generally at 90. The engine is dependently supported in a position lodged between forward frame members 30, 32 and forwardly of the connection between the rear frame members and the forward frame members. The usual engine drive shaft (not shown) connects with a transmission 92, and from this transmission drive to the rear wheels is through a shaft 94, a universal joint 96, a shaft 98 and the usual rear wheel differential 99. Should it be desired, drive to the front dirigible wheel, as well as to the rear wheels, may be provided.

Shown at 100 is an operator's cab which is supported on the frame of the vehicle with the forward extremity of the base of the cab resting on the forward frame members and the rear of the cab supported through strut structure 102 above the forward frame members. The cab is disposed over the engine to leave the rear frame expanse unobstructed, whereby it may be utilized to carry loads. Further, the operator's cab is in a position where optimum visibility is afforded on the ground over which the vehicle travels. A ladder 108 extends up the side of the vehicle to provide access to the cab.

It will be seen from the above, that the vehicle contemplated possesses a number of novel features contributing to a low center of gravity, and proper rigidity, especially in forward portions of the vehicle where twisting and vibrations can be a problem. Particular attention is drawn to the rigidity provided by the inclined forward frame members and the design and construction of the pivot mounting for the front dirigible wheel. The organization described also frees a considerable region on the rear deck expanse of the frame for mounting a load or for other vehicle uses.

The inclined forward frame members are designed to provide rigid forward framing which is more simply and economically constructed than the heavy gooseneck-type framing previously used on such vehicles. Further, with the forward frame members inclining upwardly and forwardly from a midpoint on the vehicle, sufficient clearance over the dirigible wheel may be provided with the incline for the forward members being gradual.

With respect to the pivot mounting for the dirigible wheel, with the journal mountings of the upper and lower ends of the spindle being in the upper and lower cross members of the wheel mounting bracket said mounting points are widely spaced to provide excellent resistance to twisting about a horizontal axis. Further, with the spindle being press fit in the collars on the tongue, twisting and vibrations do not produce stress concentrations therebetween as would occur if such were welded together.

While a preferred embodiment of the invention has been described, it is appreciated that variations and changes are possible without departing from the spirit of the invention.

It is claimed and desired to secure by Letters Patent:

1. A vehicle comprising a vehicle frame including a pair of laterally spaced, substantially horizontal elongated rear members extending longitudinally of the vehicle at its rear, and a pair of elongated forward members joined to said rear members and projecting forwardly and inclining upwardly therefrom, said forward members having front portions which converge on each other progressing forwardly and upwardly in the vehicle thus to form a tongue at the front end of the vehicle, a pair of rear wheels supporting said rear members and a single dirigible wheel under said tongue and supporting said forward members, means journaling said dirigible wheel on said tongue permitting swinging of said wheel about a substantially upright axis, said means including an upright spindle secured to said tongue at the forward end of the tongue, said spindle having an upper end extending above the tongue and a lower end extending below the tongue, a wheel mounting bracket having the dirigible wheel rotatably supported at its lower extremity, a bearing mounted on an upper portion of said bracket journaled on the upper end of the spindle, and a bearing mounted on an intermediate portion of said bracket journaled on the lower end of the spindle, a motor for powering the vehicle mounted on said frame and lodged between said forward members adjacent where such join with said rear members, drive means connecting said motor to said rear wheels for driving said rear wheels, and an operator's cab supported on said forward members above said motor.

2. The vehicle of claim 1, wherein said means journaling said dirigible wheel further comprises a pair of vertically spaced stabilizing collars joined to the tongue adjacent its upper and lower margins and snugly embracing upper and lower end portions of the spindle.

3. The vehicle of claim 1, wherein said wheel mounting bracket comprises a pair of spaced upright legs straddling said dirigible wheel, said upper portion of the mounting bracket comprises an upper cross member extending between and interconnecting the upper ends of said legs, and said intermediate portion of the mounting bracket comprises a lower cross member extending between and interconnecting the legs.

4. A vehicle comprising a vehicle frame including a pair of laterally spaced, substantially horizontal elongated rear members extending longitudinally of the vehicle at its rear, and a pair of elongated forward members joined to said rear members and projecting forwardly and inclining upwardly therefrom, said forward members having front portions which converge on each other progressing forwardly and upwardly in the vehicle thus to form a tongue at the front end of the vehicle, a pair of rear wheels supporting said rear members and a single dirigible wheel under said tongue and supporting said forward members, and means journaling said dirigible wheel on said tongue permitting swinging of said wheel about a substantially upright axis, said means including an upright spindle secured to said tongue at the forward end of the tongue, said spindle having an upper end extending above the tongue and a lower end extending below the tongue, a wheel mounting bracket having the dirigible wheel rotatably supported at its lower extremity, a bearing mounted on an upper portion of said bracket journaled on the upper end of the spindle, and a bearing mounted on an intermediate portion of said bracket journaled on the lower end of the spindle.

5. A vehicle comprising a vehicle frame including a substantially horizontal elongated rear section extending longitudinally of the vehicle, and a pair of elongated forward members joined to said rear section and projecting forwardly and inclined upwardly therefrom, said forward members having front portions which converge on each other progressing forwardly in the vehicle to form a tongue adjacent the front end of the vehicle, a single dirigible wheel under said tongue for supporting said forward members, and means journaling said wheel on said tongue permitting swinging of the wheel about a substantially upright pivot axis, said means comprising a pair of vertically spaced stabilizing collars joined to said forward members, an upright spindle secured to said forward members and extending through and being snugly embraced by said collars, said spindle having an upper end extending above the forward members and the upper collar in the pair and a lower end extending below the forward members and the lower collar in the pair, a wheel mounting bracket having the wheel rotatably supported at its lower extremity, a bearing mounted on an upper portion of said bracket journaled on the upper end of the spindle, and a bearing mounted on an intermediate portion of said bracket journaled on the lower end of the spindle.

6. The vehicle of claim 5, wherein said wheel mounting bracket comprises a pair of spaced, upright legs straddling said wheel, said upper portion of the wheel mounting bracket comprises an upper cross member extending between and interconnecting the upper ends of said legs, and said intermediate portion of the bracket comprises a lower cross member extending between and interconnecting the legs intermediate their ends.

* * * * *